Figure 1:
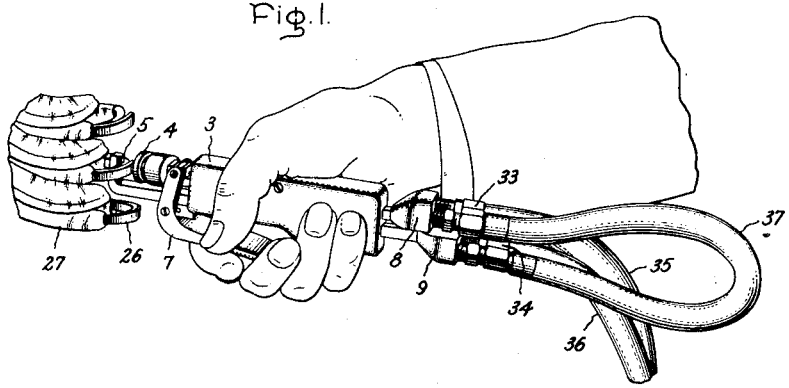

Feb. 20, 1951  J. H. CLAWSON  2,542,629
ELECTRIC HEATING APPARATUS
Filed Aug. 14, 1946

Inventor:
John H. Clawson,
by *[signature]*
His Attorney.

Patented Feb. 20, 1951

2,542,629

UNITED STATES PATENT OFFICE 2,542,629

ELECTRIC HEATING APPARATUS

John H. Clawson, Schenectady, N. Y., assignor to General Electric Company, a corporation of New York Application August 14, 1946, Serial No. 690,384

3 Claims. (Cl. 219—26)

My invention relates to electric heating apparatus and more particularly to hand tools for applying heat and pressure to a joint between parts to be united by a soldering or brazing operation.

In soldering or brazing, a plurality of parts formed of similar or dissimilar metals are joined by means of a metal or alloy having a melting point lower than the parts and identified as a solder. In electric soldering or brazing, the solder is melted by heat generated by electric current flowing through the parts and the electrodes forming part of an electric heating apparatus used for holding the parts together while the solder is made molten by the heat generated during the flow of electric current and thereafter, when the flow of heating current has been interrupted, while the solder solidifies to complete the union. If the solder has a low melting point, it is referred to as a soft solder. Such a soft solder may be any one of the numerous lead-tin alloys which have a range of melting points of the order of 300–600° F. If the solder has a high melting point, it is referred to as a hard solder. Various silver alloys and brass have been used as such hard solders and, by reason of the hitherto common use of brass as such a hard solder, such a soldering operation is frequently referred to as brazing to distinguish it from soldering, the term most frequently applied when using the low-melting lead-tin alloys as the joining metal. When the electric heating apparatus is used for brazing and involves a pair of pivoted levers it is commonly referred to as brazing tongs.

It is an object of my invention to provide electric brazing tongs that are light in weight, easily manipulated and of improved construction.

It is a further object of my invention to provide electric brazing tongs which are adapted to be held and manipulated by one hand of the user and in which there is an adjustment of parts for spacing the electrodes thereof to accommodate different size joints to be soldered or brazed without altering substantially the relative positions of the hand-gripped portions of the tongs.

It is also an object of my invention to provide electric brazing tongs in which one of the cooperating electrodes is made smaller than the other without detracting from their desired combined heating effect in response to the electric current flowing therethrough and in which these electrodes are positioned relative to one another on their supports in accordance with their size to provide a desired reduction in the size of one of the electrode supporting jaws of the tongs so that it may be inserted in restricted areas to position the electrodes relative to the part or parts to be heated.

Further objects and advantages of my invention will become apparent from the following consideration of one embodiment thereof which has been illustrated in the accompanying drawing.

Figure 2:
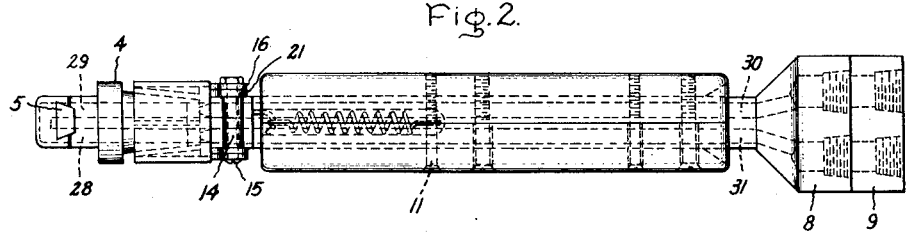
Figure 3:
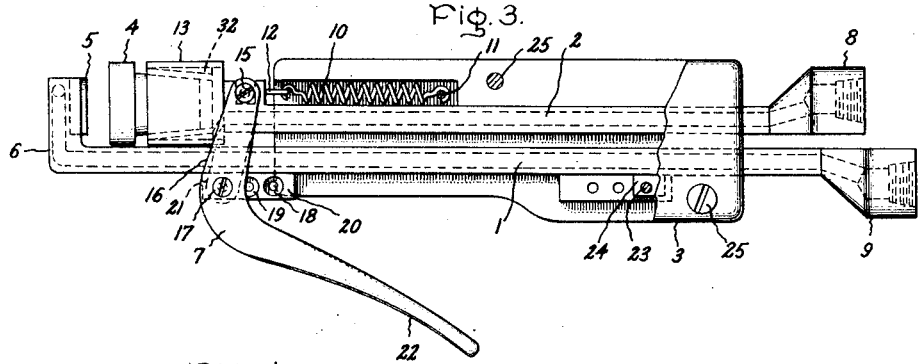
Figure 4:
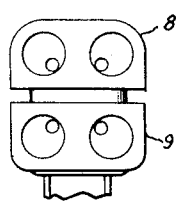

In this drawing, Fig. 1 illustrates one use that has been made of electric heating apparatus or brazing tongs embodying my invention. As shown, the tongs are held in one hand of an operator and have their electrodes positioned relative to the joint between coil end connections of a dynamoelectric machine for joining these connections by electric brazing. Figs. 2, 3 and 4 are respectively a top view, a side view with portions broken away, and an end view of the brazing tongs shown in Fig. 1.

The brazing tongs illustrated in the drawing comprise closely spaced fixed and movable electrically conductive members supported for lengthwise movement and adjustment relative to one another in a handle and having at their projecting front end portions, electrodes which are adapted to engage the work and apply heat and pressure thereto. One of these electrodes is made of a metal composition of high electrical resistance and is supported on an angular front end portion of the fixed member opposite its cooperating electrode made of a carbon composition which is supported on the straight front end portion of the movable member.

The electrode of metal composition is employed for reducing its size and the size of its support relative to the size of the electrode of carbon composition and its support. Consequently the electrode of metal composition must be thinner for a given pressure duty than the electrode of carbon composition and its electrical resistance must be high enough to provide with the electrode of carbon composition a combined resistance heating effect sufficient to melt brazing solders. The electrode of metal composition must also possess desired wear resisting qualities so that even though much thinner than its cooperating electrode it will have a use period equal to or greater than that obtained from its cooperating electrode of greater size. Furthermore, like the electrode of carbon composition, the electrode of metal composition must not stick to the work at brazing temperatures. I have found that chromium-bearing metal compositions have the non-sticking characteristics above recited due to the chromium oxide surface formed thereon when heated to brazing temperature. I may, consequently, use one of the stainless steels which possess all of the requirements above recited. I prefer to use a stainless steel containing 18% chromium and 8% nickel in cooperation with an electrode formed of carbon.

The fixed and movable members of the tongs are moved relatively to one another to bring the electrodes into and out of engagement with the work by an operating lever acting thereon and pivotally supported on the fixed member. This operating lever is provided with an arm extending lengthwise of the handle opposite a recessed portion thereof, and the movable member and the lever are held in predetermined positions relative to the handle by biasing means, such as a spring, located within the handle and acting on the movable member. An adjustable connection between the lever and the fixed member on which it is supported is provided so that the arm of the lever extending lengthwise of the handle may have substantially the same position relative thereto for different lengthwise adjustments of the fixed member in the handle. Cooling fluid and electric current are supplied to the electrode supporting ends of the fixed and movable members by suitable terminal connections of larger cross section than the fixed and movable members on the projecting rear ends of which they are mounted and offset outwardly thereof to facilitate the desired close spacing of these members.

The close spacing of the relatively movable members of the tongs provides the desired mechanical advantage of reducing the size of the angular end portion of the fixed member and makes it possible to reduce the over-all size of the tongs so that it is easy for an operator comfortably to grip and manipulate them. Furthermore, since the stainless steel electrode or its equivalent may be made thinner for a given pressure duty than a carbon electrode, the mounting thereof on the angular end portion of the fixed member further reduces its over-all dimensions adapting it for insertion in restricted areas on one side of a joint where sufficient space is available on the outside of the joint for the much larger carbon electrode. The combination of the carbon and stainless steel electrodes quickly develops upon the passage of current therethrough the desired amount of heat necessary for performing the brazing operation.

Referring to the drawing, the brazing tongs illustrated comprise closely spaced fixed and movable electrically conductive members 1 and 2 having mid portions supported in longitudinally extending passageways of a supporting handle 3 for lengthwise movement and adjustment relative to one another. The front end portion of the movable member 2 constitutes a support for a carbon electrode 4 which is spaced opposite from and cooperates with a stainless steel electrode 5 mounted on the projecting angular end portion 6 of fixed member 1. Members 1 and 2 are moved relatively to one another by a bent lever 7 pivotally fulcrumed on fixed member 1 and having one arm connected with movable member 2 for imparting motion thereto lengthwise of the handle upon movement of its other arm toward and away from handle 3. The projecting rear end portions of the fixed and movable members 1 and 2 are provided with enlarged terminals 8 and 9 for accommodating cables through which electric current is supplied through members 1 and 2 to cooperating electrodes 4 and 5 mounted on their projecting front end portions.

Movable member 2 is biased to a predetermined position in handle 3 by a tension spring 10 enclosed within the handle. The inner end of this spring is engaged by a screw 11 which passes through the handle and the outer end of this spring engages a hook 12 mounted on an enlarged front end portion of member 2 which also provides a support at its front end for socket 13 in which carbon electrode 4 is supported. The enlarged front end portion of movable member 2 is provided with a slot of sufficient width and depth to accommodate a roller 14 of electrically insulating material mounted on a pin 15 which is supported in the outer ends of the arms 16 of bent lever 7. In the arrangement illustrated, pin 15 is the shank of a bolt having at one end a slotted head and at its other end a nut which may or may not be physically attached to one of the arms 16.

Arms 16 are the two branches of the force applying arm of bent lever 7 which is pivoted at their inner ends in any one of three selected positions on fixed member 1 by means of a screw 17 constituting the fulcrum point of the lever. Screw 17 makes a threaded engagement with one of the arms and is thereby held in place. The three adjustable positions therefor are determined by sleeves of electrically insulating material 18 inserted in holes 19 formed transversely in a block 20 and extending lengthwise thereof and lengthwise of the fixed member 1 to the side of which a side of the block 20 is attached. Strips of electrically insulating material 21 are located between arms 16 of lever 7 and members 1 and 2 in order completely to insulate these members from one another as well as lever 7. These strips are held in place by bolt 15 and screw 17 previously referred to as forming part of the assembly.

The exterior of supporting handle 3 is recessed along its front end portion to accommodate the handle 22 of lever 7 when handle 22 is closed against handle 3. The enlarged portion of handle 3 beyond this recess, accommodates the adjusting means for positioning fixed member 1 therein and provides, as shown in Fig 1, a gripping surface for the little and ring fingers of the operator's hand while the remaining fingers of his hand are used to operate handle 22.

Fixed member 1 may be held in any one of three positions of adjustment in supporting handle 3 by a screw 23, which may be positioned in any one of three holes extending lengthwise of the supporting handle and spaced from one another by amounts corresponding to the spacing of holes 19 in block 20 which provide the fulcrum pivots for operating lever 7. Screw 23 is threaded at its end into a portion of the handle and extends through a lug 24 formed by a block attached to the side surface of member 1. This block moves lengthwise of a passageway provided therefor in handle 3 and forming a recess to one side of the longitudinal passageway also formed in handle 3 for fixed member 1.

As shown in the drawing, handle 3 may be formed of two complementary casings having parallel grooves extending lengthwise along their inner surfaces to form when the casings are assembled the longitudinal parallel passageways in which the midportions of fixed and movable members 1 and 2 are supported. In the arrangement illustrated, members 1 and 2 are of rectangular shape and the passageways therefor are consequently also of rectangular shape and slightly larger in cross section than these members. Since it is desirable to have fixed and movable members 1 and 2 closely adjacent one another, the complementary grooves in the handle casings are located closely together. Recesses formed laterally of the grooves in each casing provide cavities for tension spring 10 attached to movable member 2 and adjusting lug 4 attached to fixed member 1. The front end portion of each casing may also be recessed to form an open-ended cavity for the reception of block 20 also attached to fixed member 1. These casings may also be recessed at their rear end portion to provide an open-ended cavity within which the beveled front edge portion of terminal 8 may extend when movable member 2 is moved forwardly to bring electrode 4 into clamping engagement with the work in cooperation with electrode 5.

The casings forming the supporting handle 3 are assembled in cooperative relationship with one another by screws 25 which pass through one casing and make a threaded engagement with the other casing. These casings are preferably made of an electrically insulating material.

Carbon electrode 4 is provided with a tapered end portion which fits into and engages the correspondingly tapered inside walls of its supporting socket 13. As previously stated, this socket is in turn supported on the enlarged front end portion of movable member 2. The stainless steel electrode 5 is held by a dovetailed joint in an open-ended slot in the side of the angular end portion 6 of member 1 which is located opposite socket 13. In each case the electrodes 4 and 5 are held in place by reason of their frictional engagement with the members they engage.

By reason of the close spacing of members 1 and 2, the electrode supporting arm of the angular portion 6 of member 1 is kept to a minimum length so that for a given pressure applied thereto this arm may be made of smaller dimensions than would otherwise be possible if members 1 and 2 were not spaced so closely to one another. Furthermore, since the stainless steel electrode may be made thinner for a given pressure duty than a carbon electrode, the mounting of the stainless steel electrode on the angular end portion of member 1 further reduces the over-all dimensions thereof and thereby adapts it for insertion in restricted areas, such as when making the brazed joints between the coil end connections 26 of the windings 27 of a dynamoelectric machine as shown in Fig. 1 of the drawing. If both electrodes 4 and 5 are made of stainless steel, an insufficient heating effect would be obtained. However, by using one stainless steel and one carbon electrode in the manner disclosed, the combined heating effects of these electrodes is sufficient to obtain the amount of heat necessary for performing the desired brazing operation.

Electrodes 4 and 5 are cooled by circulating cooling fluid through their supports in the closest possible proximity with the electrodes. Thus in the arrangement illustrated, supply and exhaust passageways 28 and 29 extending lengthwise through terminal 9, fixed member 1 and its angular end portion 6 provide cooling at the very base of electrode 5 supported in the angular portion 6. In like manner supply and exhaust cooling passageways 30 and 31 extend lengthwise through terminal 8 and movable member 2 to passageways communicating with a ring-shaped cooling passageway 32 formed between the inner and outer walls of support 13 for electrode 4.

As shown in Fig. 1, electric current and cooling fluid are supplied to terminals 8 and 9 of the brazing tongs through connections 33 and 34 respectively joined therewith through nipples engaging the threaded openings on the right side of terminals 8 and 9 as viewed in Fig. 1. These terminals 33 and 34 connect electrical conductors enclosed within hoses 35 and 36 with the nipples located in these terminals. The hoses also supply cooling fluid to the nipples and to the cooling passages extending through members 1 and 2 to the electrode supporting portions thereof. The flow of cooling fluid through hoses 35 and 36 also cools the conductors located therein. A jumper hose connection 37 provided with connections to nipples also supported in terminals 8 and 9 provides for the connection of the exhaust fluid passageway of member 1 with the supply passageway of member 2.

Since the nipples and connections thus required are of considerable size relative to the cross sectional area of members 1 and 2, it is necessary to enlarge terminals 8 and 9 to accommodate them. Such an enlargement has been provided, as shown in the drawing, without interfering with the close spacing of members 1 and 2. This has been accomplished by offsetting terminals 8 and 9 laterally relative to one another to maintain the desired minimum spacing between the facing surfaces of members 1 and 2.

Since the voltage of the current supplied to the brazing tongs is of the order of but 8 to 12 volts, it is not necessary to electrically insulate terminals 8 and 9 since if the operator's hand engages these bare terminals no shock will occur and no burn will result.

The electric current supplied to the tongs may be derived from any suitable source, such as the secondary winding of a brazing transformer having its primary winding connected with a source of supply through a control switch. This control switch may be operated by the hand or foot of the operator in manners well known to those skilled in the art. The switching arrangement and the brazing transformer or its equivalent have therefore not been illustrated in the drawing.

The operation and use of the brazing tongs is self-evident from a consideration of Fig. 1 of the drawing. Briefly stated, the operator places electrodes 4 and 5 on opposite sides of the joint to be brazed, brings these electrodes into engagement with the joint by depressing operating handle 22 of bent lever 7, and then applies current to the electrodes in order to develop the heat necessary for making the brazed joint. Current is supplied until the parts have reached the brazing temperature determined by the solder used. After the solder has been melted the flow of heating current is interrupted and the joint held under pressure by the tongs until the joint has cooled sufficiently to cause the solder to set and hold the parts together.

The brazing solder may be inserted in the joint as solid material or may be melted and fed into the joint by applying a stick thereof to the heated joint members. For brazing the coil end connections illustrated an alloy known to the trade as Sil-Fos has been successfully used although other suitable solders may be used. Sil-Fos is particularly suitable since no flux is needed when using this material to form a joint between copper parts and parts of cupreous material. Sil-Fos softens at about 1185° F. and is completely fluid at about 1300° F. The composition of the Sil-Fos successfully used is as follows: Copper 80%, silver 15%, and phosphorus 5%.

With the adjustment of parts illustrated in the drawing, it is obvious that electrodes 4 and 5 are spaced comparatively close to one another, as would be required when making joints of slight thickness. However, in order to make thicker joints it is necessary to space electrodes 4 and 5 from one another a greater distance. This can be accomplished by removing screw 23 from handle 3 and advancing member 1 therein so that the hole in lug 24 matches either of the holes more closely adjacent the front end of the handle. This will cause fixed member 1 of the tongs to project a greater distance from its supporting handle 3. It may also cause operating handle 22 of lever 7 to be separated from supporting handle 3 by so great a distance as to be without the finger reach of the hand of the operator. If so, it is necessary to adjust the fulcrum point of screw 17 for bent lever 7 to a position determined by one of the holes 19 in block 20 so that operating handle 22 of bent lever 7 again assumes the same desirably spaced position relative to supporting handle 3 of the brazing tongs that it occupied before making the adjustment.

It is of course apparent that my invention may be variously modified in its applications without departing from the spirit and scope thereof. Thus, for example, electrodes of different configurations attached to their supports in a different manner from those illustrated may be employed and the size and shapes of the various parts of the tongs may be modified without departing from my invention. Furthermore, my invention is not limited to the use of cooperating electrodes of stainless steel and carbon since other compositions having the characteristics above recited may be employed. Instead of insulating the electrically conductive parts of the brazing tongs by employing the construction described, other arrangements will occur to those skilled in the art for accomplishing this same purpose. Thus, for example, supporting handle 3 may be made of metal provided the electrically conductive parts of members 1 and 2 and the parts connected therewith are electrically insulated from one another by other suitable means. I have found it desirable to make terminals 8 and 9, bars 1 and 2 and the electrode supports of cupreous materials, such as brass or beryllium bronze. It is of course apparent that other conductive material may be employed without departing from the spirit and scope of my invention.

Thus, in view of the above description of my invention, it is apparent that many variations and modifications may be made by those skilled in the art to which it relates, and I therefore aim to cover by the appended claims all such variations and modifications which come within the spirit and scope of my invention.

What I claim as new and desire to secure by Letters Patent of the United States is:

1. Electric heating apparatus comprising a handle having passageways extending lengthwise therethrough, fixed and movable bar conductors extending lengthwise through said handle and having mid portions located in said passageways, cooperating electrodes mounted opposite one another on and in electrically conductive engagement with said front end portions of said bar conductors, a bent lever pivotally mounted by a fulcrum pivot on said fixed bar conductor and having one arm connected with said movable bar conductor for imparting motion thereto lengthwise of said handle upon movement of its other arm toward and away from said handle along which it extends, means for electrically insulating said bar conductors from one another and from said bent lever, an adjustable connection between said fixed bar conductor and said handle for securing a desired projection from said handle of said front end portion of said fixed bar conductor, a corresponding adjustable connection between said fulcrum pivot of said bent lever and said fixed bar conductor for maintaining substantially the same relative positions between said bent lever and said handle for different positions of adjustment of said fixed bar conductor in said handle, and electrically conductive terminals mounted on the projecting rear end portions of said bar conductors and providing connections for supplying electric current through said bar conductors to said electrodes.

2. Electric heating apparatus comprising a handle having lengthwise therethrough parallel passageways with adjacent flat surfaces closely spaced relative to one another, fixed and movable bar conductors of substantially the same cross section as said passageways in said handle in which they are supported and through which they extend, one of said members having an angular front end portion projecting across the straight front end portion of the other of said members; a stainless steel electrode mounted on and in electrically conductive engagement with the angular front end portion of one of said members opposite a carbon electrode mounted on and in electrically conductive engagement with the straight front end portion of the other of said members, a bent lever pivotally fulcrumed on said fixed bar conductor and having one arm connected with said movable bar conductor for imparting motion thereto lengthwise of said handle upon movement of its other arm toward and away from said handle along which it extends, electrical insulation between said bent lever and said bar conductors, spring means in said handle for biasing said movable bar conductor and said bent lever to a predetermined position relative to said handle, an adjustable connection between said fixed bar conductor and said handle for determining the amount that the front end portion of said fixed bar conductor projects from said handle, a corresponding adjustable connection between the fulcrum pivot of said bent lever and said fixed bar conductor for maintaining substantially the same relative positions between said bent lever and said handle for different positions of adjustment of said fixed bar conductor in said handle, and electrically conductive terminals of larger cross sectional area than said bar conductors to accommodate the electric current and cooling fluid connections for said bar conductors, said terminals being mounted on the projecting rear end portions of said bar conductors and being laterally offset outwardly of each of said bar conductors to provide said close spacing thereof and each of said terminals and said bar conductors having supply and exhaust cooling fluid passageways extending lengthwise therethrough to a connection therebetween in the front end portions of said bar conductors.

3. Electric heating apparatus comprising a supporting handle of electrically insulating material having rectangular passageways extending lengthwise therethrough with adjacent flat surfaces thereof parallel and closely spaced relatively to one another and having an external recessed portion extending along part of one side thereof from its front end, fixed and movable rectangular bar conductors of substantially the same cross section as said passageways in said handle in which they are supported and through which they extend, each of said bar conductors having supply and exhaust passageways for cooling fluid extending lengthwise thereof, means located in the portion of said supporting handle extending beyond said recessed portion thereof for attaching said fixed bar conductor in any one of a plurality of positions spaced lengthwise of that passageway in said handle which is next adjacent the recessed portion thereof, an operating handle extending lengthwise of the recessed portion of said supporting handle and having angularly disposed arms spaced relative to one another to accommodate said bar conductors therebetween, a pivot support between the inner ends of said arms of said operating handle and said fixed bar conductor, said pivot support being adjustable to any one of a plurality of positions spaced lengthwise of the portion of said fixed bar conductor extending from the front end of said supporting handle, a connection between said operating handle and said movable bar conductor for transmitting lengthwise movement thereof through said supporting handle and relative to said fixed bar conductor, said connection including a slot in said movable bar conductor and a roller mounted on a pin supported in the outer ends of said arms of said operating handle and acting through said roller on the side walls of said slot, electrical insulating material between said bar conductors and said operating handle, a spring enclosed within said handle and acting thereon and on said movable bar conductor for biasing said movable bar conductor and said operating handle to predetermined positions relative to said supporting handle, cooperating electrodes mounted opposite one another on the front end portions of said bar conductors projecting from said supporting handle, and terminals mounted on the ends of said bar conductors that project from the rear end of said supporting handle, said terminals being of larger cross sectional area than said bar conductors to accommodate electric current and cooling fluid connections for supplying current and cooling fluid to said bar conductors and said terminals being offset laterally relatively to one another to permit said close spacing of said bar conductors in their said passageways in said supporting handle.

JOHN H. CLAWSON.

REFERENCES CITED

The following references are of record in the file of this patent:

UNITED STATES PATENTS

| Number | Name | Date |
|---|---|---|
| 853,351 | Fulton | May 14, 1907 |
| 1,211,009 | Thornton | Jan. 2, 1917 |
| 1,630,990 | Wagg | May 31, 1927 |
| 1,807,004 | Nelson | May 26, 1931 |
| 2,253,994 | Barclift | Aug. 26, 1941 |
| 2,295,195 | Barnum | Sept. 8, 1942 |
| 2,321,368 | Dodkin et al. | June 8, 1943 |

FOREIGN PATENTS

| Number | Country | Date |
|---|---|---|
| 878,263 | France | Jan. 15, 1943 |